Jan. 18, 1966   W. L. ROBERTS   3,229,513
METHOD FOR DETECTING DEFECTS ON SURFACES
Filed Feb. 23, 1962
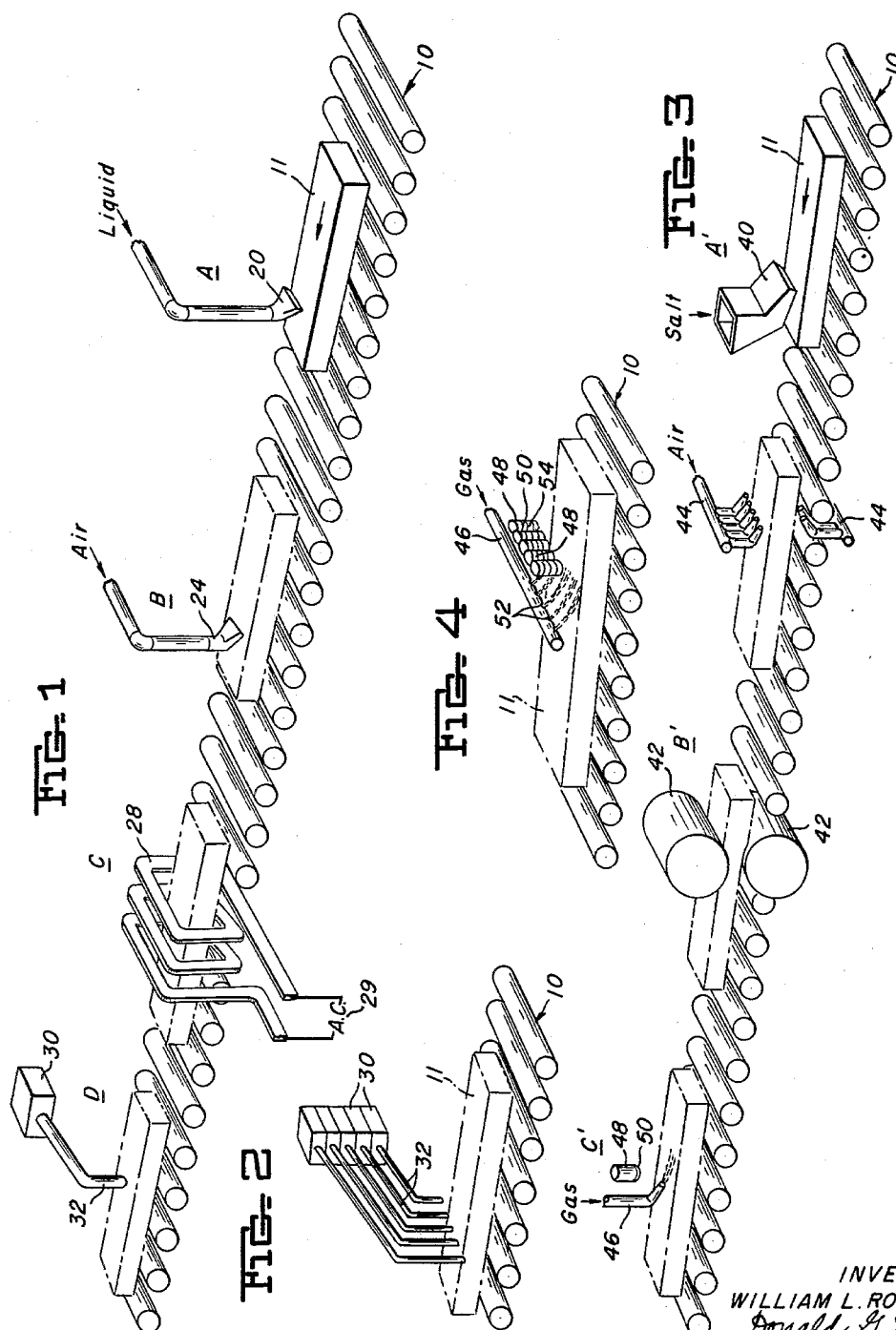
INVENTOR
WILLIAM L. ROBERTS
By Donald G. Dalton
Attorney United States Patent Office 3,229,513
Patented Jan. 18, 1966

3,229,513
METHOD FOR DETECTING DEFECTS
ON SURFACES
William L. Roberts, Murrysville, Pa., assignor to United
States Steel Corporation, a corporation of New Jersey
Filed Feb. 23, 1962, Ser. No. 174,943
4 Claims. (Cl. 73—104)

This invention relates to flaw detection and more particularly to the detection of surface defects on solid articles.

Numerous devices and methods have been proposed for detection of surface defects on solid articles. Several of these devices rely on magnetic fields for this detection. These devices require that the article be capable of being magnetized at its surface. Further, these devices require a visual inspection of the article to determine the location of any defects. Hence, a skilled operator must be present to determine whether a particular surface pattern represents a defect.

Other proposals for detecting surface defects include the application of liquid penetrants which flow into the surface imperfections and a subsequent application of a second substance to cause a visual indication of the presence of any penetrant trapped in a defect. Similar devices use selected types of radiation to reveal the presence of penetrants in a defect in place of the second substance. Each of these proposals is deficient in that visual observation by trained personnel is necessary.

It is therefore a principal object of this invention to provide an improved method for detecting surface defects on solid articles.

It is a related principal object of this invention to provide an improved apparatus for detecting surface defects on solid articles.

A more particular object of this invention is the detection of surface defects on articles by the use of penetrants which produce detectable vapors.

It is a further object of this invention to detect surface defects in solid articles by the use of penetrants which emit vapors capable of being detected by instruments.

Expressed another way, a principal object of this invention is to provide for the detection of surface defects on solid articles which does not require visual observation for determination.

A more particular object of this invention is to provide for the detection of surface defects on non-magnetic articles.

Another object of this invention is to provide a method of detection of surface defects on solid articles which when used with suitable penetrants and detectors is effective over an extended range of workpiece temperatures.

These and other objects will be more apparent after referring to the following specification and attached drawings, in which:

FIGURE 1 is a diagrammatic representation of one embodiment of the surface defect detector of this invention;

FIGURE 2 is a diagrammatic view of a modified form of the detector portion of the device of FIGURE 1;

FIGURE 3 is a diagrammatic representation of another embodiment of the invention for use on articles at elevated temperatures; and FIGURE 4 is a diagrammatic view of a modified form of the detector portion of the device of FIGURE 3.

Referring now to the drawings and particularly to FIGURE 1 an embodiment of this invention is shown for detecting surface defects on solid articles at ambient temperature. The preferred method for detecting surface defects on articles at ambient temperature includes the application of a halogen containing liquid to the surface of the article. Any defects will be penetrated by the liquid and thereafter the liquid which has not penetrated any surface defect, hereinafter referred to as excess liquid, is removed. The liquid which has penetrated the defect is then allowed to vaporize either naturally into the atmosphere or by heat and the presence of such vapor is detected by a halogen detector. The apparatus of FIGURE 1, suitable for carrying out this method, is shown in a typical environment in conjunction with a roller conveyor 10. The conveyor 10 is adapted to support and transport billets, blooms, or slabs 11 which are to be inspected for surface defects. The operation of this will be described as it is used for detection of surface defects on steel billets. However it is to be understood that the device can be used for the detection of surface defects on any solid article.

The apparatus includes four stations A, B, C and D to which a billet is successively moved. Billet 11 is shown in solid lines at station A and in phantom outline at stations B, C and D. At station A a liquid, halogen containing compound, preferably 1, 1, 1, trichloroethane, is sprayed onto the surface of the billet by a suitable nozzle 20 which is connected to a suitable source of supply of trichloroethane (not shown). The trichloroethane will spread over the surface of the billet and penetrate any surface defects.

After the liquid has been applied at station A the billet is moved to station B wherein the excess liquid is removed. At station B an air jet 24 is provided which is connected to a suitable source of compressed air (not shown). As the billet passes the air jet 24, compressed air is directed against the surface of the billet which will drive off substantially all of the excess trichloroethane, but it will not remove the trichloroethane which has penetrated into surface defects. Hence, after passing station B the billet has been cleared of all trichloroethane except that which has penetrated into surface defects. Although it is preferred to dry the surface by an air jet it is possible to allow the excess trichloroethane to evaporate from the surface by merely exposing the surface to the atmosphere. Although this is slower than jet drying the excess trichloroethane will rapidly evaporate leaving a quantity of the liquid in any surface defect. Hence, it can be seen that the removal of the excess material may be either by mechanical drying or by merely allowing it to evaporate and as used herein removing the excess liquid refers either to mechanically removing it or removing it by allowing natural evaporation.

From station B the billet is transported to station C where it is heated by induction coil 28 connected to power source 29. This heating is provided only in cases where the penetrant has a low vapor pressure at ambient temperature and may be omitted where the vapor pressure of the penetrant is sufficiently great at ambient temperature to produce a readily detectable vapor. Hence, as used herein "permitting the trapped liquid to vaporize" refers either to natural or induced vaporization.

Immediately after the billet has been heated by the heating coil 28 or while the vapor is rising from the surface defects, the billet is passed under a halogen detector 30, at station D. A suitable halogen detector is manufactured by the General Electric Company and is described in GE Apparatus Catalogue, Meter and Instrument Volume, Section 8240. The detector 30 includes an aspirating tube 32 which terminates adjacent the surface of the billet and is adapted to draw up vapor from the surface of the billet. If any halogen containing compound is present in the vapor the detector 30 will indicate the presence of this vapor.

Referring now to FIGURE 2 a modification of station D is shown. In this modification a plurality of halogen detectors 30 are shown with each having an aspirating tube 32. The tubes are arranged so that they lie on a line transversely across the surface of a billet as it passes through station D. With this type of arrangement not only is the longitudinal location of a defect discernible, but also its relative position transversely on the billet is detactable. This is especially desirable where the surface defects are to be removed such as by scarfing, and scarfing torches are employed responsive to the detectors or where the defects are to be marked, such as by paint spray responsive to the detectors. If the billet is wide it is preferred not to scarf the whole width as would be required with a single detector, but rather only scarf that portion which has the defect or mark that portion for later scarfing. Thus, it is desirable in the case of wide billets or slabs to use the modification shown in FIGURE 2. Further, by the use of proper instrumentation the profile of the defect can be closely approximated. This can be done by continuously recording the responses of each of the detectors 30. Also, the responses of the detectors can be integrated to provide an indication of the general quality of a number of articles being checked.

Although FIGURES 1 and 2 show the device arranged to operate only on the top surface of the billet, by suitably arranging nozzles, jets, and detectors, liquid can be sprayed on any number or all of the surfaces simultaneously, the excess removed, and defects on any number or all of the surfaces detected in one pass of a billet through the apparatus.

Referring now to FIGURE 3, a device for detecting surface defects in an article at elevated temperature is shown in conjunction with a two-high reversing primary mill for producing steel billets. This device is adapted to apply fusible volatile chemicals, such as salts, to the surface of received ingots or partially rolled billets. The chemicals are selected to contain elements which have distinctive discernible spectrographic characteristics when vaporized. The salt will melt when it comes into contact with the hot billet and penetrate any surface defects. The excess salt is removed and the heat of the billet will cause the salt trapped in the defects to vaporize. Flames are impinged on the surface of the billet and when they contact salt vapors the presence of the vapors will be revealed by the element imparting a distinctive characteristic color to the flame.

In the device of FIGURE 3 there are stations A', B' and C' through which a billet is successively passed. At station A' a hopper 40 is provided which is adapted to deposit salt onto the surface of an ingot or a billet as the billet passes therebeneath. From station A' the billet is delivered to station B'. Station B' includes a pair of reversing rolls 42 adapted to roll billets from ingots. The rolling helps the fused salt to penetrate into surface defects which are opened rather wide at the beginning of the rolling. During the rolling of the billet, scale is being formed on the billet between successive passes. As much as $\frac{1}{32}''$ thickness may scale off between successive passes. This scale is knocked off during the rolling operation and carries with it any excess salt from surface of the billet. Conventional descaling jets 44 are also provided. Scale also is removed by the manipulation of the billet between successive passes during rolling.

From the rolling station B' the billet is delivered to station C'. Station C' includes a flame jet 46 which directs a virtually colorless flame against the surface of the billet. Coke oven gas or blast furnace gas may be used for this flame. When the flame encounters vapor issuing from the salt trapped in a surface defect it will assume a color or colors characteristic of the elements of the vapor. In the disclosed embodiment sodium chloride is preferred which imparts the well known distinctive yellow color of sodium to the flame. The presence of this color is determined by a phototube 48 positioned above the billet. The phototube 48 has a suitable filter 50 for filtering out all but characteristic sodium radiation. The phototube 48 will detect the presence of the sodium lines in the spectrum and signal when it so detects these lines. Hence, a signal delivered by the phototube 48 indicates that a surface defect has passed thereunder.

Referring now to FIGURE 4 a modification of the device of FIGURE 3 is shown which modification is similar to the modification of FIGURE 1 shown in FIGURE 2. In FIGURE 4 a plurality of openings 52 are provided in the torch 46 so that a plurality of discreet flames are impinged upon the billet transversely across it as it passes beneath the torch 46. A plurality of phototubes 48 are provided above the flames extending across the width of the billet. Each of these phototubes 48 includes a filter 50 and preferably a collimator 54. These tubes then detect the presence of sodium lines in the flame immediately below them. The signal from the phototubes can then be used to actuate scarfing torches or markers as in the embodiment of FIGURE 2, or a profile of the defects can be obtained in the manner described.

Although this description has necessarily been detailed, it is believed that essentially the invention comprises the locating of surface defects in solid articles by the use of penetrants having detectable vapors.

While several embodiments of my invention have been shown and described, it will be apparent that other adaptations and modifications may be made without departing from the scope of the following claims.

I claim:

1. A method of detecting and locating surface defects on solid articles at ambient-temperature comprising the steps of: applying to the surface of said article a vaporizable liquid, said liquid having the ability to penetrate surface defects on said article, then removing any liquid on the surface which has not penetrated into any surface defect, next permitting any liquid in the surface defects to vaporize, and detecting, at the locations of the defects, any vaporized liquid.

2. A method of detecting and locating surface defects on solid articles at ambient temperature comprising the steps of applying to the surface of said article a vaporizable liquid having a volatile halogen constituent, said liquid having the ability to penetrate surface defects on said article, thereafter removing any liquid which has not penetrated into any surface defect, next permitting the material in any defect to vaporize, and detecting, at the locations of the defects, the said vaporized material with a halogen detector.

3. The method of claim 2 wherein said liquid applied is 1,1,1, trichloroethane.

4. A method of detecting and locating surface defects on solid articles comprising the steps of covering the surface of said article with a vaporizable liquid, said liquid having the ability to penetrate surface defects on said article, then removing any liquid on the surface which has not penetrated into any surface defect, next permitting any liquid in the surface defects to vaporize, and detecting, at the locations of the defects, any vaporized liquid.

References Cited by the Examiner

UNITED STATES PATENTS

| 2,706,398 | 4/1955 | Davidson | 73—40.7 |
| 2,839,918 | 6/1958 | Switzer | 73—104 |
| 3,012,467 | 12/1961 | Rosenthal | 88—14 |
| 3,020,033 | 2/1962 | McCreanor et al. | 73—104 X |

FOREIGN PATENTS

| 214,838 | 4/1958 | Australia. |

OTHER REFERENCES

Barnes et al.: Argonne National Laboratory, Helium Leak Detector Test for Hanford and Savannah River Fuel Slugs. Printed Dec. 31, 1952, unclassified Aug. 4, 1960. Pg. 3 (copy in 73–40.7).

Neff, J. R.: How to Test for Leaks Reliably, Quickly, and at Low Cost. In General Electric Review, Pg. 44, October 1949 (copy in 73–40.7).

RICHARD C. QUEISSER, *Primary Examiner.*

JOSEPH P. STRIZAK, *Examiner.*